United States Patent
Ferris et al.

(10) Patent No.: US 6,510,678 B2
(45) Date of Patent: *Jan. 28, 2003

(54) LOAD COMPENSATION ADJUSTMENT IN LAWNMOWER HAVING INDEPENDENT SUSPENSION

(75) Inventors: David Ferris, Oneida, NY (US); William Shea, Oneida, NY (US); Henry Nordberg, Oneida, NY (US)

(73) Assignee: Ferris Industries, Inc., Munnsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/879,800

(22) Filed: Jun. 12, 2001

(65) Prior Publication Data

US 2002/0035824 A1 Mar. 28, 2002

Related U.S. Application Data

(63) Continuation of application No. 09/384,534, filed on Aug. 27, 1999, now Pat. No. 6,244,025, which is a continuation-in-part of application No. 09/359,537, filed on Jul. 22, 1999, which is a continuation-in-part of application No. 09/144,499, filed on Aug. 31, 1998, now Pat. No. 5,946,893, and a continuation-in-part of application No. 09/119,818, filed on Jul. 21, 1998, now Pat. No. 6,170,242.

(60) Provisional application No. 60/063,362, filed on Oct. 28, 1997, provisional application No. 60/053,403, filed on Jul. 22, 1997, provisional application No. 60/063,362, filed on Oct. 28, 1997, and provisional application No. 60/022,865, filed on Jul. 26, 1996.

(51) Int. Cl.[7] .................. A01D 34/03; A01D 34/43; A01D 34/64
(52) U.S. Cl. .................. 56/15.8; 56/DIG. 3
(58) Field of Search ............... 56/15.8, 15.7, 56/DIG. 3, DIG. 22, DIG. 16; 220/124.129, 124.136, 124.141

(56) References Cited

U.S. PATENT DOCUMENTS

| | | | |
|---|---|---|---|
| 1,826,113 A | 10/1931 | Winsor | 280/124.113 |
| 2,032,657 A | 3/1936 | Frederickson | 280/124.11 |
| 2,482,216 A | 9/1949 | Rust | 56/11.9 |
| 2,709,881 A | 6/1955 | Goss | 56/15.2 |
| 2,805,079 A | 9/1957 | Vostrez | 280/79.11 |
| 2,859,578 A | 11/1958 | Hall | 280/92 |
| 2,874,972 A | 2/1959 | Anderson et al. | 280/92 |
| 3,024,041 A | 3/1962 | Maruhn | 280/124.109 |
| 3,159,959 A | 12/1964 | Mathews | 56/15.7 |
| 3,408,089 A | 10/1968 | Edwards | 280/99 |
| 3,686,840 A | 8/1972 | Root | 56/15.8 |
| 3,696,594 A | 10/1972 | Freimuth et al. | 56/15.2 |
| 3,719,371 A | 3/1973 | Musgrave | 280/124.135 |
| 3,913,696 A | 10/1975 | Kennedy et al. | 180/312 |
| 3,940,161 A | 2/1976 | Allison | 280/124.108 |
| 4,077,191 A | 3/1978 | Pittinger, Sr. et al. | 56/12.7 |
| 4,159,128 A | 6/1979 | Blaine | 280/5.521 |
| 4,159,613 A | 7/1979 | Knudson et al. | 56/11.3 |
| 4,301,881 A | 11/1981 | Griffin | 180/6.48 |
| 4,724,661 A | 2/1988 | Blakeslee et al. | 56/208 |
| 4,787,646 A | 11/1988 | Kamlukin et al. | 280/124.113 |
| 4,809,796 A | 3/1989 | Yamaoka et al. | 180/6.48 |
| 4,843,804 A | 7/1989 | Wellman | 56/16.4 C |

(List continued on next page.)

Primary Examiner—Robert E. Pezzuto
Assistant Examiner—Árpád F Kovács
(74) Attorney, Agent, or Firm—Michael Best & Friedrich LLP

(57) ABSTRACT

A lawn mower includes a front wheel suspension system as well as a rear wheel suspension system. A load compensation adjuster is employed as part of the rear wheel suspension system that compensates for riders having significantly differing weights, as well as for weight changes occurring during the mowing operation, such as from grass clippings accumulating in a grass catcher bag.

48 Claims, 12 Drawing Sheets

U.S. PATENT DOCUMENTS

| | | |
|---|---|---|
| 4,957,307 A | 9/1990 | Gandiglio ............ 280/124.141 |
| 5,129,218 A | 7/1992 | Youngberg et al. .......... 56/15.8 |
| 5,197,755 A | 3/1993 | Quick ................ 280/124.141 |
| 5,305,588 A | 4/1994 | Minato et al. ........... 56/10.2 E |
| 5,322,143 A | 6/1994 | Curran ....................... 187/211 |
| 5,337,544 A * | 8/1994 | Lauritsen .................... 56/15.7 |
| 5,355,664 A | 10/1994 | Zenner ...................... 56/15.8 |
| 5,367,864 A | 11/1994 | Ogasawara et al. .......... 56/15.8 |
| 5,381,648 A * | 1/1995 | Seegert et al. ............... 56/17.1 |
| 5,431,243 A | 7/1995 | Richards .................... 180/211 |
| 5,433,066 A | 7/1995 | Wenzel et al. ............... 56/14.2 |
| 5,435,591 A | 7/1995 | Lee .................... 280/124.139 |
| 5,507,138 A | 4/1996 | Wright et al. ................. 56/14.7 |
| 5,765,858 A | 6/1998 | Kawagoe et al. ...... 280/124.15 |
| 5,799,475 A | 9/1998 | Borling et al. ............... 56/14.7 |
| 5,865,020 A | 2/1999 | Busboom et al. .......... 56/320.1 |
| 5,873,224 A | 2/1999 | Murakawa et al. .......... 56/11.4 |
| 5,946,893 A | 9/1999 | Gordon ....................... 56/15.8 |
| 5,947,495 A | 9/1999 | Null et al. ............. 280/87.042 |
| 6,062,333 A | 5/2000 | Gordon ....................... 180/311 |
| 6,170,242 B1 | 1/2001 | Gordon ....................... 56/15.8 |
| 6,244,025 B1 * | 6/2001 | Ferris et al. ................. 56/15.8 |
| 6,276,119 B1 * | 8/2001 | Oshima et al. .............. 56/17.1 |

* cited by examiner

LOAD COMPENSATION ADJUSTMENT IN LAWNMOWER HAVING INDEPENDENT SUSPENSION

REFERENCE TO RELATED APPLICATIONS

This is a continuation patent application of U.S. patent application Ser. No. 09/384,534 filed on Aug. 27, 1999 and issued as U.S. Pat. No. 6,244,025, which is a continuation-in-part patent application of (1) U.S. patent application Ser. No. 09/359,537 filed on Jul. 22, 1999 which in turn is a continuation-in-part patent application of (i) copending U.S. patent application Ser. No. 09/144,499, filed Aug. 31, 1998 and issued as U.S. Pat. No. 5,946,893, which in turn claims benefit from Provisional patent application Ser. No. 60/063,362 filed on Oct. 28, 1997; (ii) copending U.S. patent application Ser. No. 09/119,818 filed on Jul. 21, 1998 and issued as U.S. Pat. No. 6,170,242, which in turn claims benefit from Provisional patent application Ser. No. 60/053,403 filed on Jul. 22, 1997 and Provisional patent application Ser. No. 60/063,362, filed on Oct. 28, 1997; and (iii) U.S. patent application Ser. No. 08/898,801, filed on Jul. 23, 1997 and issued as U.S. Pat. No. 6,062,333, which in turn claims benefit from Provisional patent application Ser. No. 60/022,865 filed on Jul. 26, 1996; and (2) U.S. patent application Ser. No. 09/119,818, filed on Jul. 21, 1998 and issued as U.S. Pat. No. 6,170,242, which in turn claims benefit from Provisional patent application Ser. No. 60/053,403 filed on Jul. 22, 1997 and Provisional patent application Ser. No. 60/063,362, filed on Oct. 28, 1997, all of which are incorporated herein by reference.

FIELD OF THE INVENTION

The invention pertains to the field of lawnmowers. More particularly, the invention pertains to lawnmowers of the riding type having rear wheel independent suspension.

BACKGROUND OF THE INVENTION

The present invention is described with respect to its use on riding lawn mowers, particularly self-propelled machines fitted with rotating blades for cutting turf grasses. In the most favored typical design, the rider sits atop a three or four wheeled machine, while one or more blades rotate about a vertical axis within a mower deck mounted at the underside of the machine, to cut grasses as the machine moves across the surface being mowed.

In many typical riding mowers, the cutter deck is configured as either a ground-following deck or a floating deck. A ground-following deck typically rides on either two or four caster wheels and follows the contours of the ground. A floating deck is hung between the front and rear wheels and beneath the chassis by chains, links or other devices, being adapted to rise up when skids, wheels, rollers and the like attached to the underside of the deck make contact the lawn surface. Generally, the intent for such deck suspension system is to avoid continuing contact with the earth surface. The distance of the cutter deck from the earth surface is determined by the elevation of the chassis. When the mower crosses an earth-surface rise which is relatively severe, that is, short in horizontal length compared to the wheel base of the mower and great in height compared to the pre-set elevation of the mower deck, the deck frequently makes contact with the earth surface. Then, it is intended that the deck rises or "floats" upwardly, so the rotary blades do not hit the earth surface. Such designs work well for many kinds of unevenness, but scalping for certain earth surfaces and mower movements is still a problem. Even if there is no scalping, a variation of the height of the cutter deck relative to the earth surface is not wanted, as it varies the height of the cut grass.

Many typical prior art mowers have the wheels rigidly attached to the chassis. Thus, unevenness in the earth surface imparts a lot of up and down chassis motion. Some prior art mowers employ center-pivoting axles which somewhat reduce the vertical motion of the chassis when one wheel encounters unevenness. The related applications describe a preferred transmission steerable mower which has rear drive wheels which are independently driven and spring suspended from the chassis, and which has free pivoting caster front wheels, mounted at the outer ends of a pivotable axle or subframe. The cutter deck is suspended between the front and rear wheels.

Mowers with improved spring suspension systems reduce the amount of chassis motion when one or both drive wheels of a mower encounter uneveness in the surface being mowed. Drive wheel traction is improved. However, depending on the particulars of any non-rigid suspension system, the chassis is enabled to roll relative to the earth surface, such as, for example, when the mower is sharply turning or when the mower is traversing a steep hillside. When a mower rolls, a floating cutter deck moves closer to the earth surface and there can be a tendency for scalping of the turf by the cutter deck. An improvement in one of the related applications connects the cutter deck with the rear wheels, thereby ensuring that the cutter deck moves relative to the wheels and ground instead of relative to the chassis of the mower.

A problem still exists with the independent suspension system of the related applications. For heavier weight riders or mower accessories, such as grass catchers, the spring used in the suspension system limits the suspension. Rider discomfort occurs when the spring bottoms out. In addition, the collapsed spring can create coil bind which drastically reduces the life of the spring. Merely substituting a stiffer spring for the existing spring causes a harder ride when the load is light. A suspension that works effectively with a wide range of weight variations is therefore needed.

SUMMARY OF THE INVENTION

Briefly stated, a lawn mower includes a front wheel suspension system as well as a rear wheel suspension system. A load compensation adjuster is employed as part of the rear wheel suspension system that compensates for riders having significantly differing weights, as well as for weight changes occurring during the mowing operation, such as from grass clippings accumulating in a grass catcher bag.

According to an embodiment of the present invention, a mower includes a main frame; first and second rear wheels; and first and second rear suspension systems connecting the first and second rear wheels, respectively, to the main frame, wherein the first and second rear suspension systems each include a load compensation adjuster.

According to an embodiment of the present invention, a mower includes a main frame; first and second rear wheels; first and second rear suspension systems connecting the first and second rear wheels, respectively, to the main frame; wherein each of the first and second rear suspension systems includes a motor mount effective for mounting a motor; first and second upper links; first and second lower links; the first upper link and the first lower link pivotably connected on one end to a first vertical strut, the first vertical strut connecting an upper frame member of said main frame to a lower frame member of the main frame; the first upper link and the first lower link pivotably connected on another end to the motor mount; the second upper link and the second lower link pivotably connected on one end to a second vertical strut, the second vertical strut connecting the upper frame member to the lower frame member; the second upper link and the second lower link pivotably connected on another end to the motor mount; a spring bracket on the upper frame member between the first and second vertical struts; a rear suspension spring connected between a second spring bracket and either the motor or the motor mount; and a load compensation adjuster connected inside the rear suspension spring.

DESCRIPTION OF THE PREFERRED EMBODIMENT

Figure 1:
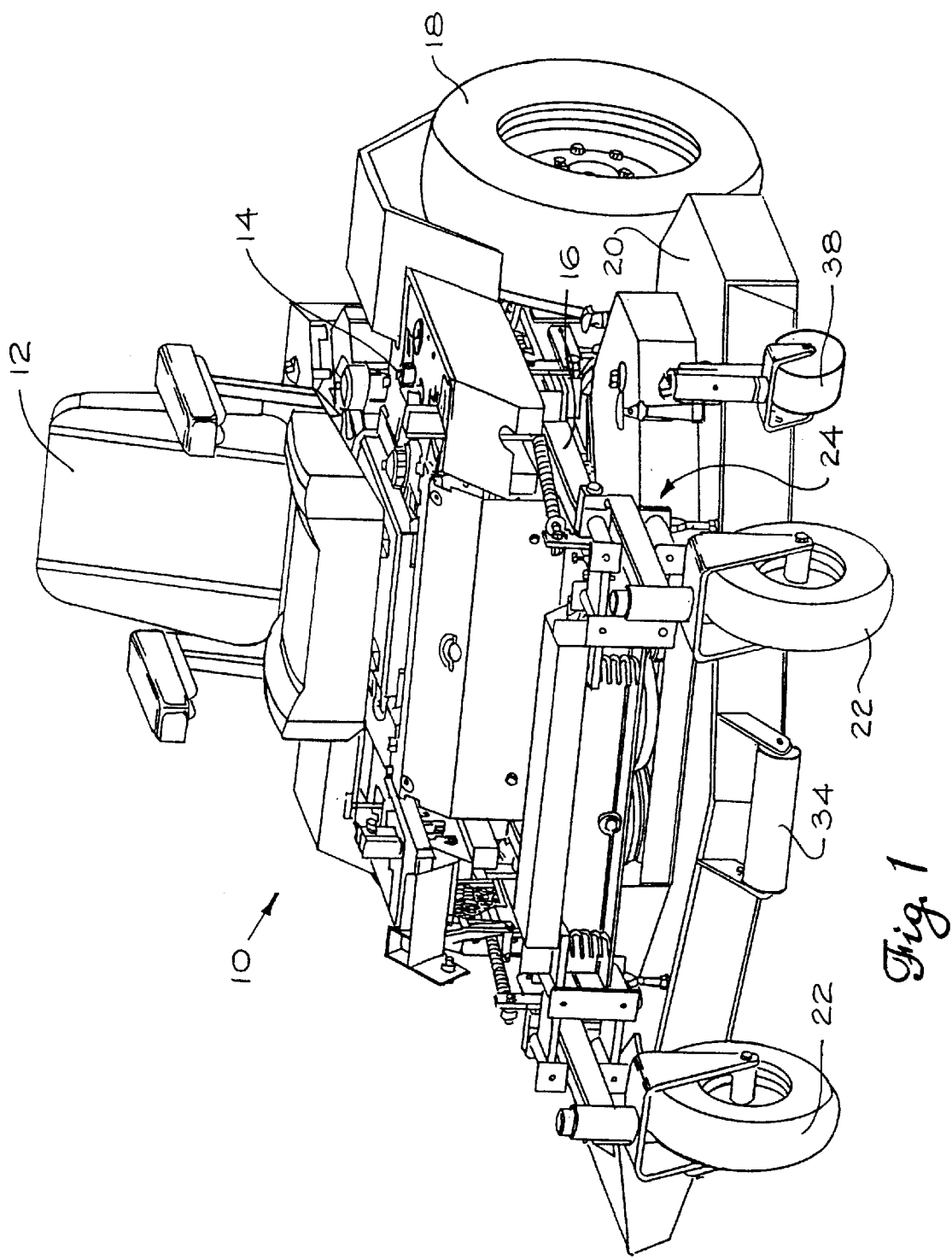
FIG. 1 shows a perspective view of a lawn mower having a front suspension system according to an embodiment of the present invention.
Figure 2:
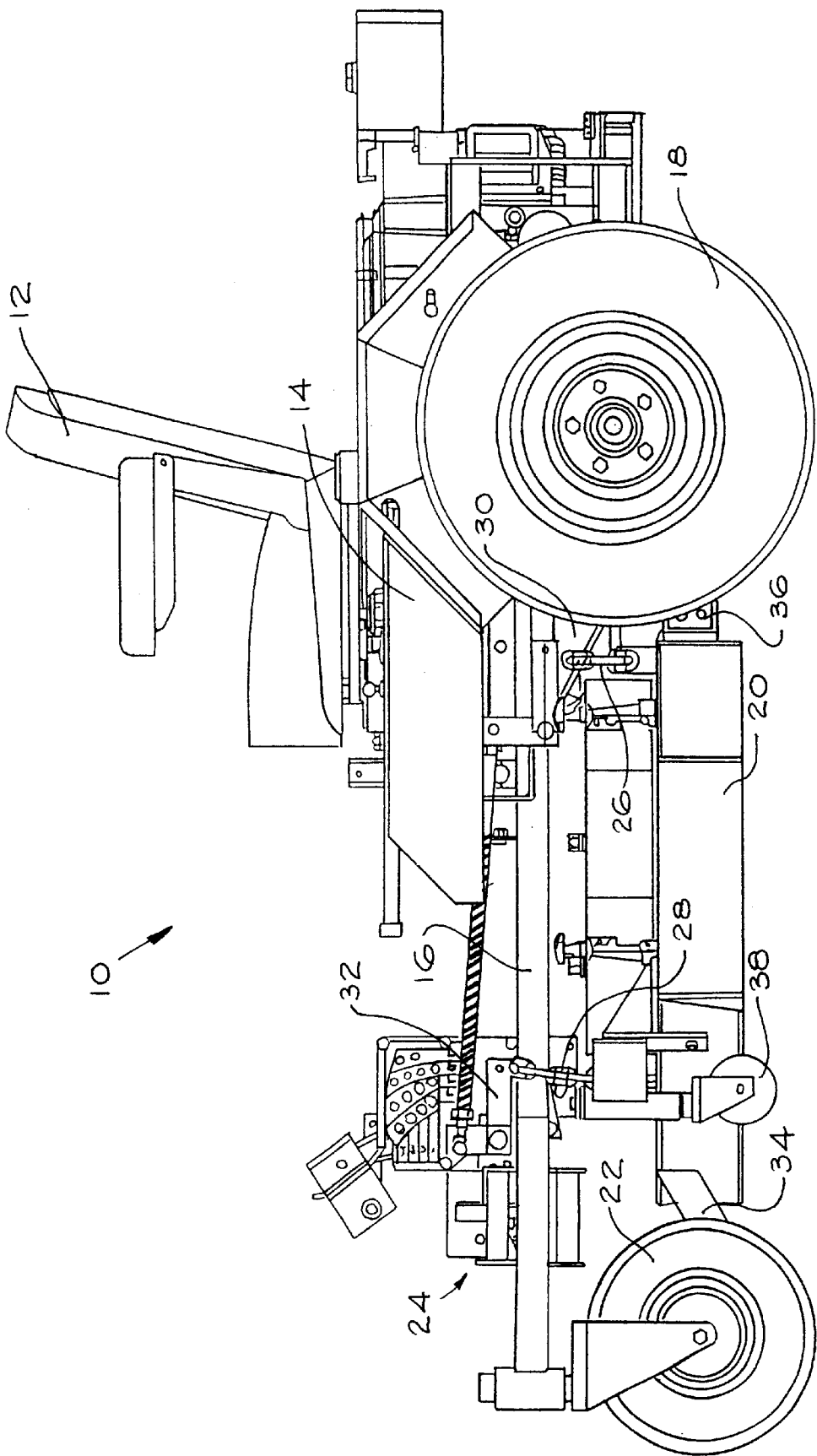
FIG. 2 shows a side elevation view of the lawn mower of FIG. 1.

Referring to FIGS. 1–2, a lawn mower 10 includes a seat 12 connected to a chassis 14. Chassis 14 in turn rests on a main frame 16. Two rear wheels 18 are connected to main frame 16 by the independent suspension (not shown) as described in co-pending U.S. patent application Ser. No. 09/119,818. Two front wheels 22 are connected to main frame 16 via a front suspension system, shown generally at 24. A floating cutter deck 20 is preferably suspended beneath main frame 16 by rear suspension chains 26 and front suspension chains 28. Each rear suspension chain 26 is preferably connected to a rear wheel bracket 30 which is "wheel-side" of the rear independent suspension system. Each front suspension chain is preferably connected to a deck height adjustment mount 32 which is part of front suspension section 24. Suspending cutter deck 20 from the "wheel-side" of the front and rear independent suspensions ensures that cutter deck 20 moves vertically up and down in response to the vertical motion of front wheels 22 and rear wheels 18, which in turn are responsive to the terrain being mowed. Scalping and uneven cuts of the grass are thus prevented.

Although the mower of the present invention can be equipped with either a ground-following cutter deck or a floating cutter deck, using a floating cutter deck with a mower having independent suspension requires additional considerations. Rolling of a lawn mower chassis is induced under certain situations. Among them are: (a) when the mower changes direction while traveling forward and centrifugal force acts laterally at the center of gravity of the machine; (b) when the mower traverses a slope and the gravitational force vector shifts direction relative to the plane of the mower wheel tread, and (c) when the mower travels over a surface undulation, lifting or lowering one or both wheels on one side, thereby rotating the mower chassis in space.

Conventional mowers typically use wheels that are rigidly connected to the chassis. In these mowers, the chassis cannot roll relative to the wheels; therefore, there is no rolling of types (a) and (b). Other conventional mowers have a pivoting front or rear axle at one end, with an opposing end axle rigidly attached to the chassis. In these mowers, the rigidly attached axle limits the chassis roll which the pivoting axle otherwise permits to the extent the chassis is sufficiently rigid. The mower of the present invention, preferably having both front and rear independent wheel suspension systems, beneficially minimizes any rolling of the machine when a wheel passes over certain small bumps and depressions—type (c) rolling. Nonetheless, larger bumps and depressions can induce rolling.

Figure 9:
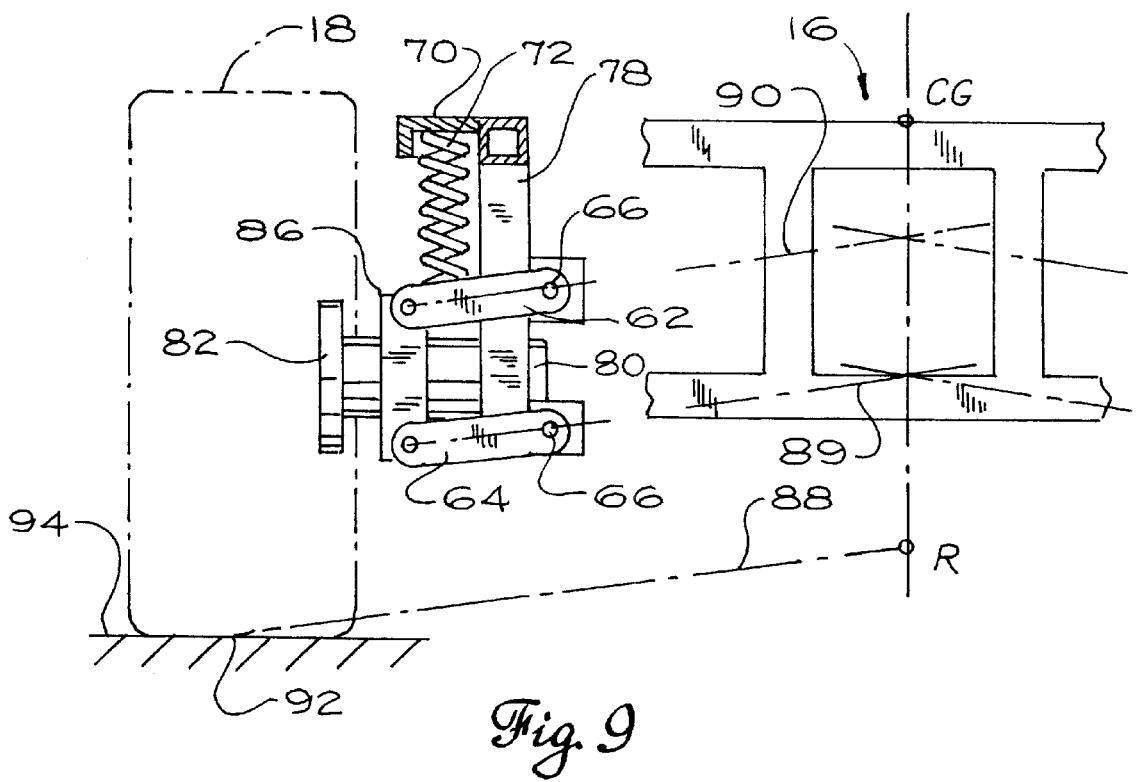
FIG. 9 shows a partial rear elevation view of a portion of the rear suspension system of FIG. 6.

As will be explained below, the suspension configuration of FIG. 9 is prone to rolling of types (a) and (b). If cutter deck 20 of mower 10 is suspended from the chassis, rolling may adversely affect the essential mower function, that is, cutting grass to an even height. In particular, when the chassis rolls and one side moves closer to the earth surface, a cutter deck suspended from the chassis also moves closer to the surface. Therefore, the preferable embodiment of the present invention couples the motion of the cutter deck to the motion of a sprung wheel rather than directly to the chassis, thereby reducing the change in cutter deck height relative to the mowed surface when the chassis rolls.

Due to the large cutting width preferred in commercial mowers and the distance between the front wheels 22, rocks or other uneven terrain features that are avoided by front wheels 22 can damage cutter deck 20. Cutter deck 20 therefore preferably includes a front roller 34, a rear roller 36 (partially hidden by rear wheel 18 in FIG. 2), and front caster wheels 38 that protect cutter deck 20 from damage.

Figure 3:
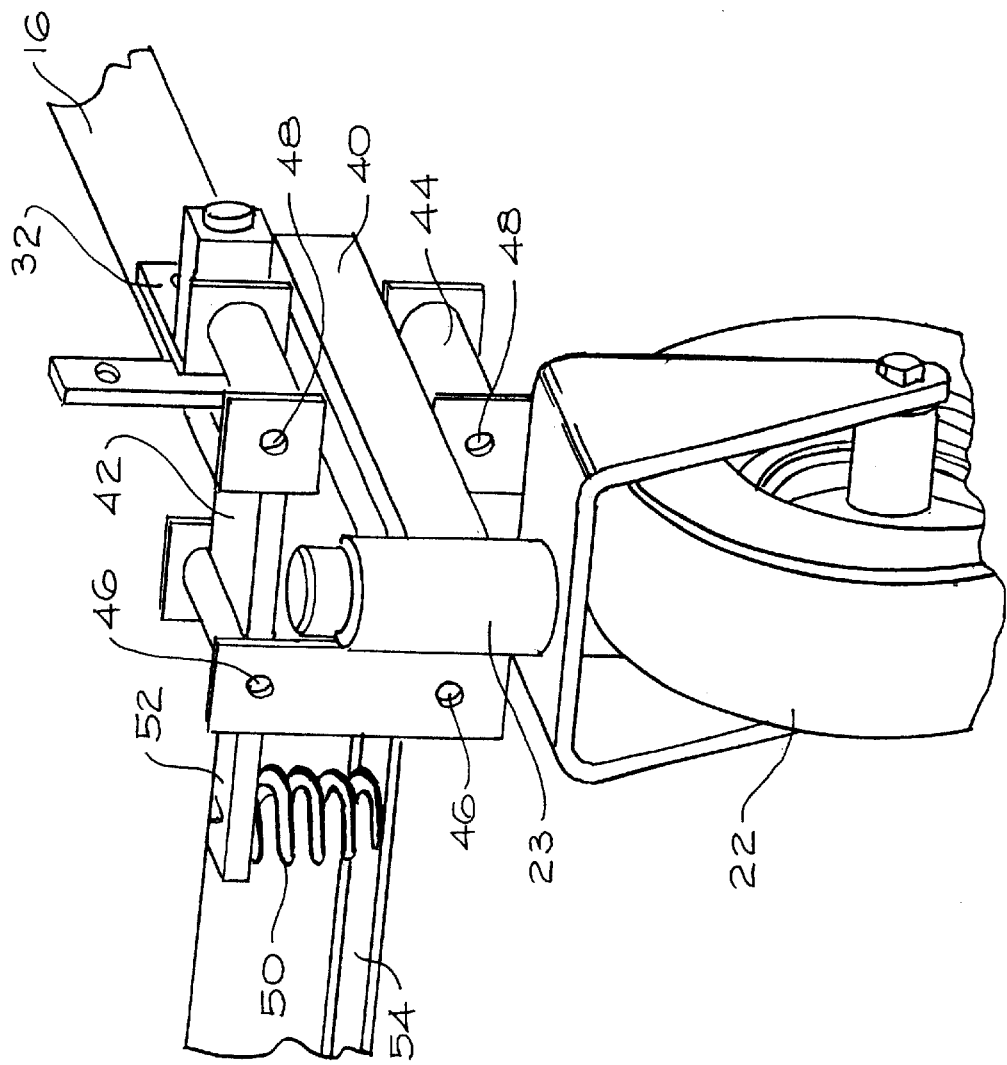
FIG. 3 shows a sectional perspective view of the front suspension system of the present invention.
Figure 4:
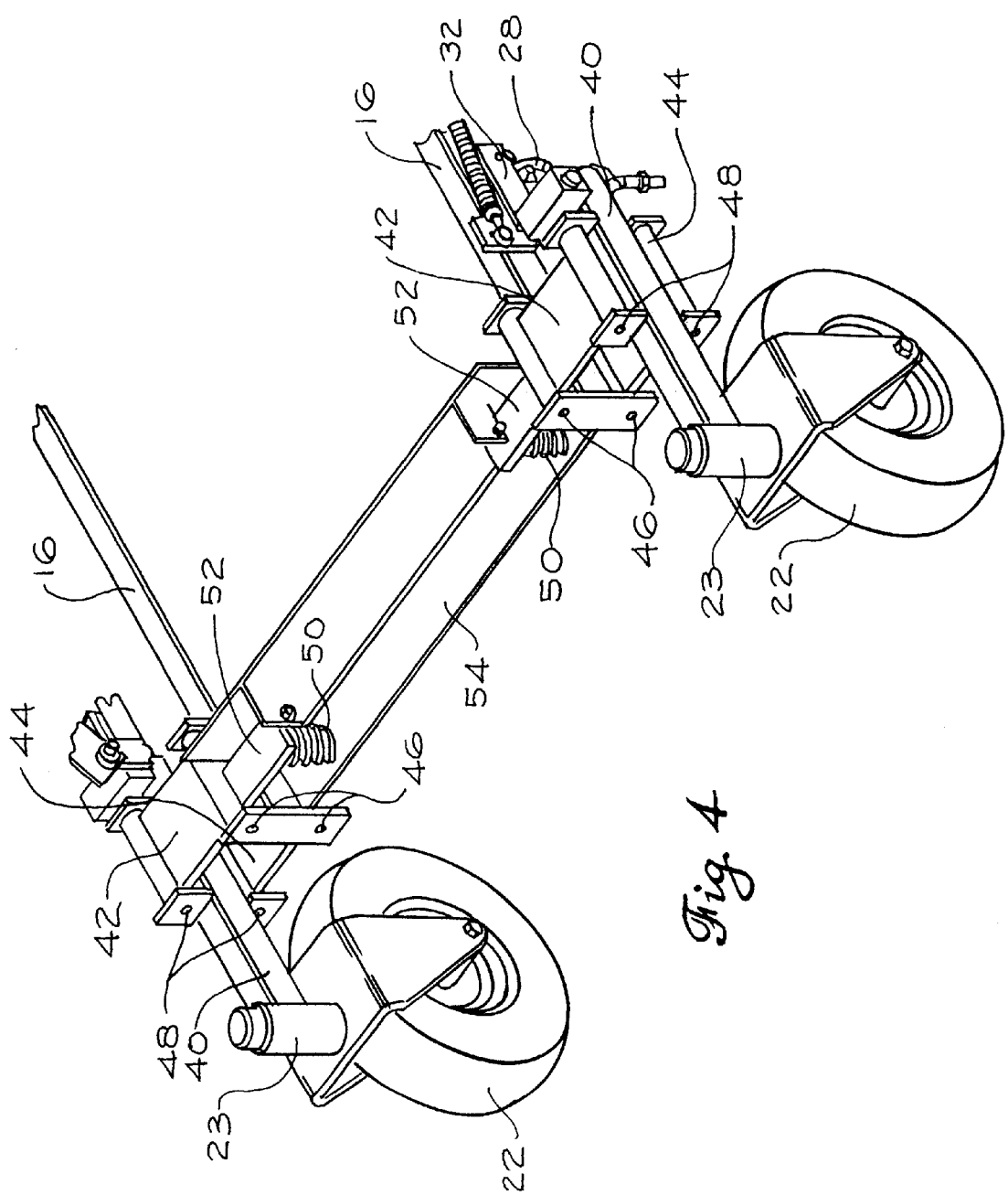
FIG. 4 shows a sectional perspective view of the front suspension system of the present invention.
Figure 5:
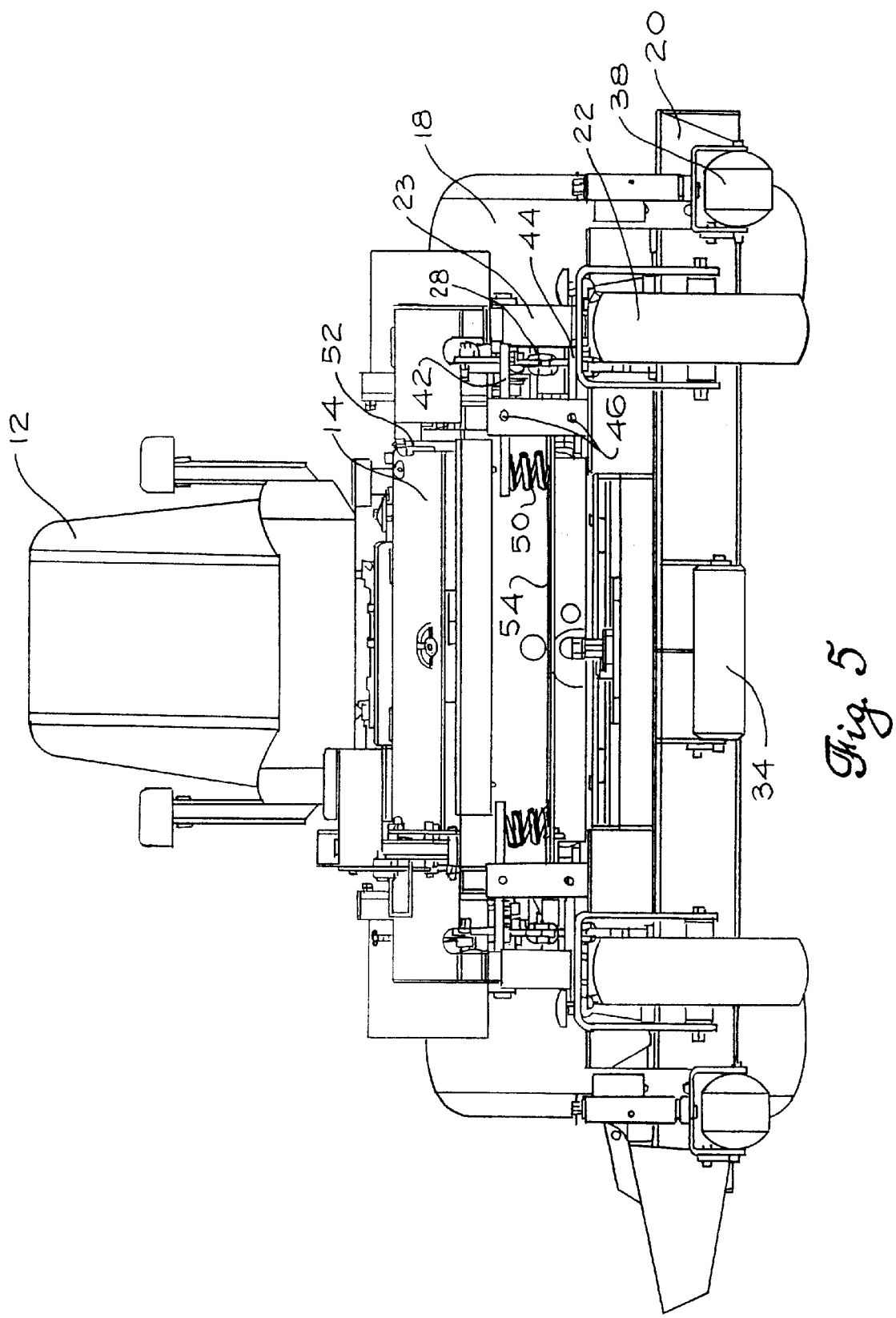
FIG. 5 shows a front elevation view of the lawn mower of FIG. 1.
Figure 6:
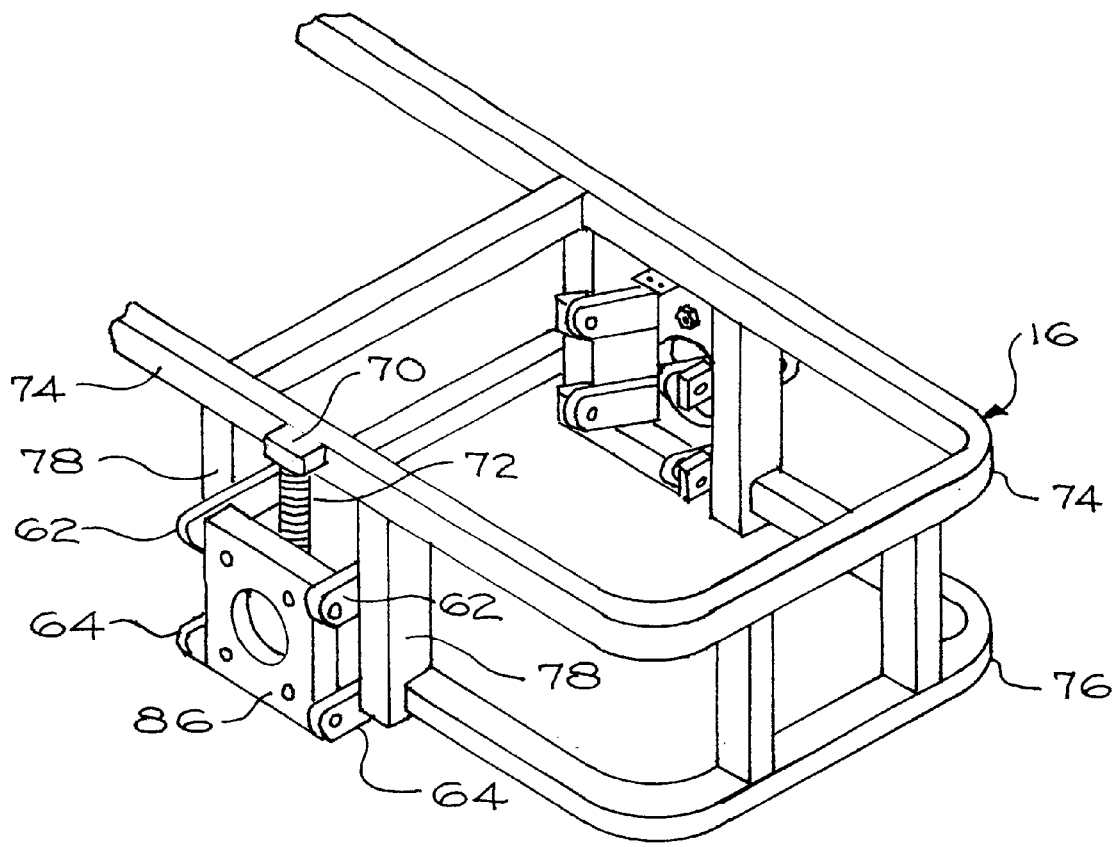
FIG. 6 shows a partial perspective view of a rear suspension system according to an embodiment of the present invention.
Figure 7:
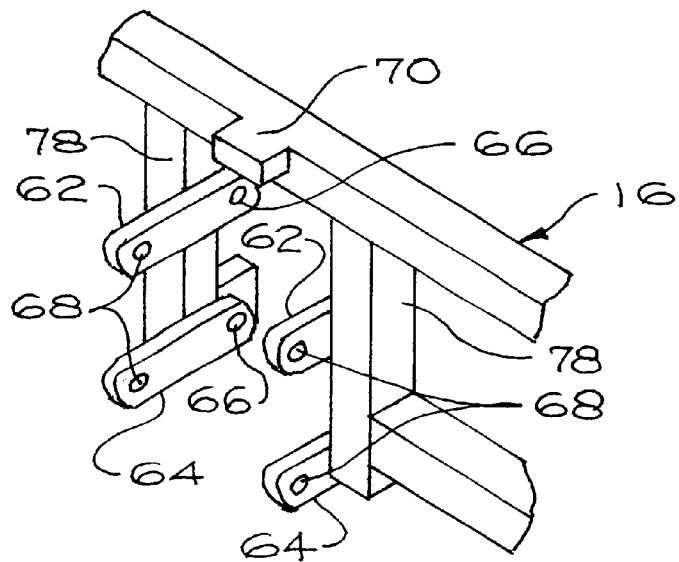
FIG. 7 shows a partial perspective view of a portion of the rear suspension system of FIG. 6.

Referring to FIGS. 3–5, front suspension system 24 includes a longitudinal suspension strut 40 that is connected to main frame 16 via an upper suspension strut 42 and a lower suspension strut 44. Front wheel 22 is connected to longitudinal strut 40 via a trunnion 39. Upper and lower suspension struts 42, 44 pivotably connect to main frame 16 at a plurality of main frame pivot points 46 and pivotably connect to longitudinal suspension strut 40 at a plurality of front suspension pivot points 48. A spring 50 is fixed between a spring bracket 52 of upper suspension strut 42 and a front transverse member 54 of main frame 16 so that upward movement of suspension system 24 compresses spring 50 between spring bracket 52 and front transverse member 54. Upper and lower suspension struts 42, 44 are preferably of equal length so that the suspension travel does not change the perpendicularity of front wheel 22 to the ground.

As front wheels 22 move vertically up and down in response to the terrain, the front of cutter deck 20, being connected to longitudinal suspension strut 40 via adjustment mount 32, moves vertically up and down in response to the vertical motion of front wheels 22. Main frame 16 is isolated from the vertical motion of front wheels 22 by front suspension system 24.

Figure 8:
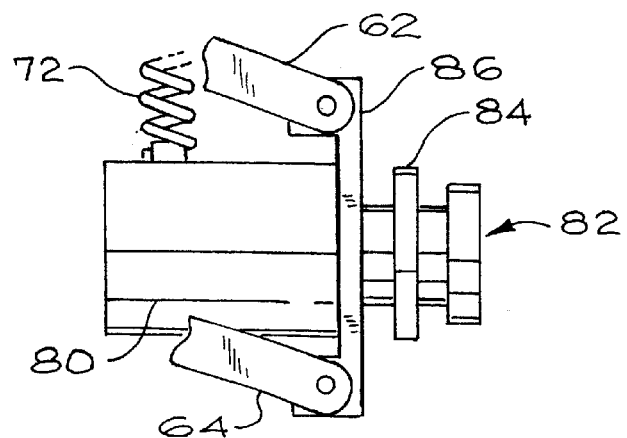
FIG. 8 shows a partial side elevation view of a portion of a rear suspension system according to an embodiment of the present invention.

Referring to FIGS. 6–9, a rear suspension system for mower 10 includes a motor mount 86 connected to main frame 16 via upper links 62 and lower links 64. Two struts 78 join an upper frame member 74 of main frame 16 to a lower frame member 76 of main frame 16. Upper and lower links 62, 64 are connected to struts 78 at main frame pivot points 66 and to motor mount 86 at rear suspension pivot points 68. Upper and lower links 62, 64 are shown in this embodiment as being of equal length. A spring 72 is captured between a spring bracket 70 of upper frame member 74 and a motor 80. FIG. 8 additionally shows an optional disk 84 on a wheel hub 82 that is used with disk brakes instead of the more conventional band-drum brakes typically used on prior art lawn mowers.

Referring specifically to FIG. 9, a roll center is an imaginary point about which a mower with movable suspension elements tends to roll when subjected to lateral forces. A roll axis of the mower runs through the front and rear roll centers. The location of a roll center R for the rear wheel suspension system is determined by examining the intersection of an upper link phantom line 90 and a lower link phantom line 89. Line 90 runs through the pivot points for upper link 62 while line 89 runs through the pivot points for lower link 64. A ground contact phantom line 88 runs from a ground contact point 92, representing the contact between rear wheel 18 and ground 94, to the intersection of lines 90 and 89. In the embodiment described above, where upper and lower links 62, 64 are of equal length, lines 90 and 89 intersect at infinity. Line 88 therefore intersects lines 90 and 89 at infinity; line 88 is thus parallel to lines 90 and 89. The intersection of line 88 with a vertical plane passing through a center of gravity (mass) of the mower is the location of roll center R.

In this embodiment, roll center R is substantially lower in elevation than the center of gravity CG of the mower. The location of roll center R can be moved vertically by changing the lengths and angles of the link assemblies. With roll center R significantly below center of gravity CG, the mower tends to sway or rock to the side when turning. Sway bars (not shown), also known as anti-sway or anti-roll bars, are optionally added to this equal-link-length suspension to inhibit swaying during turning. Such bars are typically torsion bars or other elastic structure which, when one wheel moves closer to the chassis, resist such motion with a force, the reaction to which is applied to the opposite wheel. Notwithstanding the tendency to roll, the FIG. 9 suspension provides a better vehicle ride and absorption of bumps compared to an unequal link-length suspension. The FIG. 9 suspension also minimizes lateral motion when the mower load changes, such as when an operator mounts or dismounts the mower, removes a grass-catcher bag, or when there are changes in the mower's vertical momentum due to uneven terrain.

Figure 10:
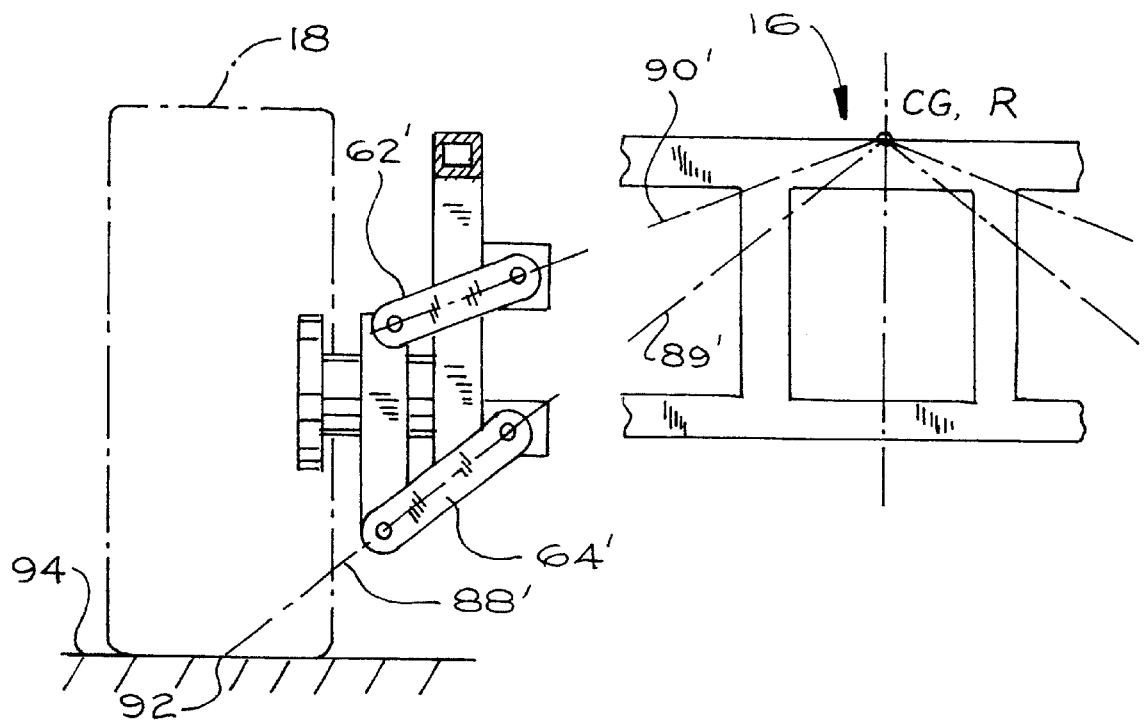
FIG. 10 shows a partial rear elevation view of a portion of a rear suspension system according to an embodiment of the present invention.

Referring to FIG. 10, an embodiment is shown with unequal link lengths. An upper link 62' is shorter than a lower link 64', with the lengths of links 62', 64' preferably determined such that the roll center R and the center of gravity CG substantially coincide. As shown in the figure, phantom lines 90' and 89' intersect at R, so ground contact line 88' intersects the vertical plane passing through the center of gravity CG at the center of gravity CG. This configuration minimizes the roll tendency of the mower during turning.

Figure 11:
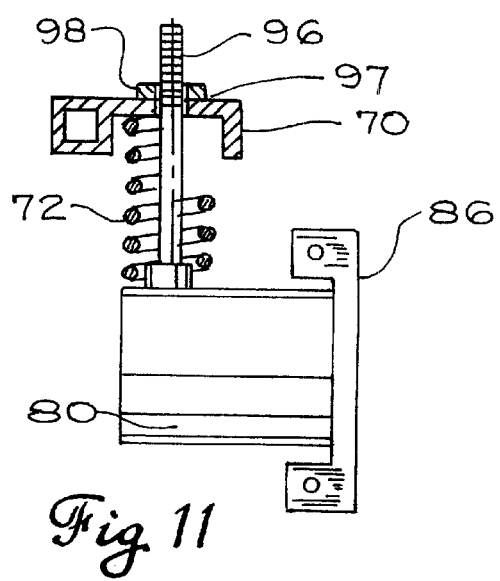
FIG. 11 shows a partial sectional view of a pre-compressed spring used in the rear suspension system according to an embodiment of the present invention.

Referring to FIG. 11, a way of pre-compressing spring 72 is shown. Pre-compression is desirable to lessen the movement of the mower chassis when the mower operator mounts and dismounts the mower. Pre-compression is preferably accomplished by pivotably attaching a threaded guide rod 96 to motor 80. Rod 96 extends through a hole 97 in spring bracket 70 with a nut 98 on the threaded end of rod 96. Nut 98 is preferably adjustable so that the amount of pre-compression can be changed when required.

Figure 12:
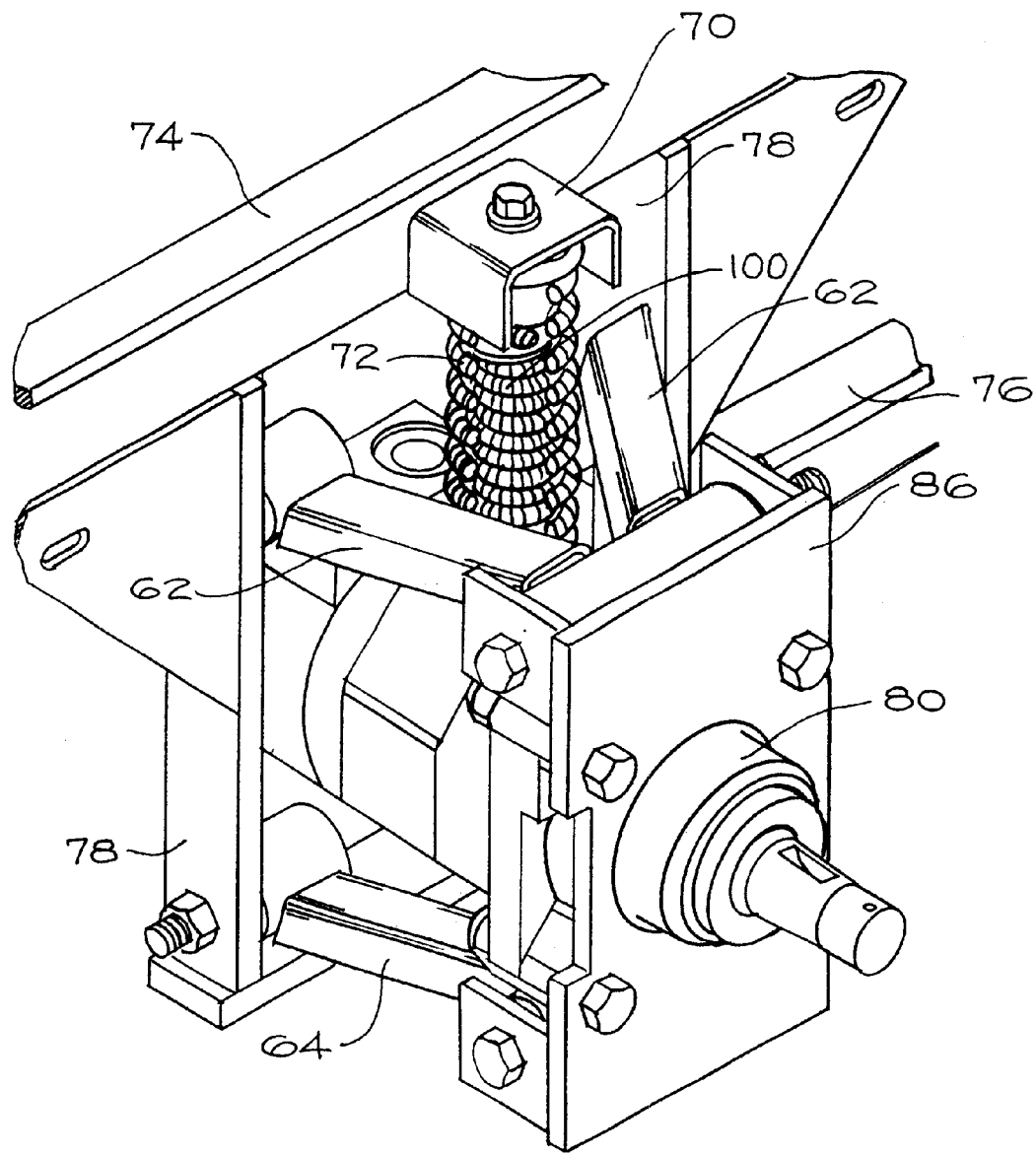
FIG. 12 shows a cutaway view of an embodiment of a load compensation adjuster according to an embodiment of the invention, wherein the load compensation adjuster is a suspension spring with an overload spring installed inside, as installed in the rear suspension system of FIGS. 6, 7, and 9.
Figure 13:
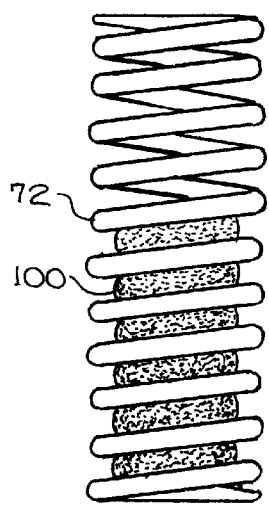
FIG. 13 shows an elevation view of the load compensation adjuster of FIG. 12.

Referring to FIGS. 12–13, a load compensation adjuster such as overload spring 100 is installed inside spring 72. If suspension spring 72 is a closed, ground end, compression spring with a right hand helix, overload spring 100 is preferably a closed, ground end, compression spring with a left-hand helix. Overload spring 100 fits inside spring 72 and is approximately one inch shorter in length than spring 72. The shorter length of overload spring 100 allows spring 72 to operate at its existing rate, but when spring 72 is compressed more than one inch, overload spring 100 begins to help carry the extra weight. Overload spring 100 is preferably wound with coils in the opposite direction from spring 72.

The characteristics of the preferred embodiment of overload spring 100 is detailed in Table 1.

TABLE 1

| Spring type | compression spring, closed and grounded end |
|---|---|
| Material | chrome silicon |
| Wire Diameter | 0.2340 in. |
| Mean Diameter | 1.0160 in. |
| Inside diameter | 0.7820 in. |
| Outside Diameter | 1.2500 in. |
| Total Coils | 15.6984 in. |
| Pitch | 0.3308 in. |
| Pitch Angle | 5.9177 deg. |
| Weight | 0.6120 lbs. |
| Free Length | 5.0000 in. |
| Solid Height | 3.6734 in. |

TABLE 1-continued

| | |
|---|---|
| Load Rate (lbs./in.) @ 0 lbs. | 5.00 in. (free length) |
| @150 lbs. | 4.50 in. |
| @300 lbs. | 4.00 in. |
| @398 lbs. | 3.67 in. (solid height) |

Figure 14:
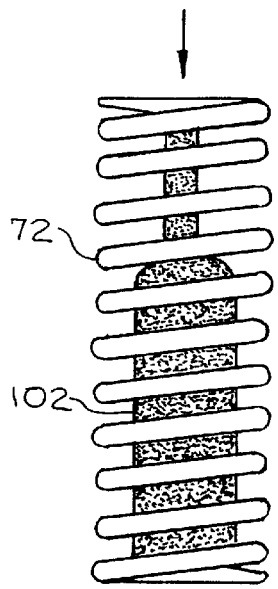
FIG. 14 shows an elevation view of a shock absorber embodiment of the load compensation adjuster of the present invention.

Referring to FIG. 14, load compensation adjustment is achieved using an alternative embodiment such as a shock absorber 102 inside spring 72 in place of overload spring 100. This arrangement is commonly referred to as a coil-over suspension.

Figure 15:
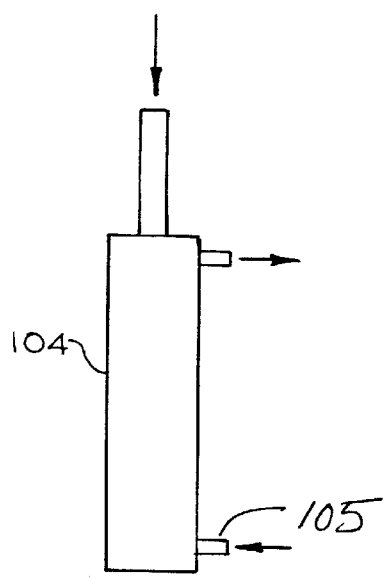
FIG. 15 shows an elevation view of an air shock embodiment of the load compensation adjuster of the present invention.

Referring to FIG. 15, load compensation adjustment is achieved using an alternative embodiment such as an air shock 104 instead of shock absorber 102, although not depicted inside spring 72 in the figure. Air shocks and their construction and operation are well known to those skilled in the art, and are not therefore described further herein. Using air shock 104 allows adjustment of the spring tension by raising or lowering the air pressure via a port 105, thereby determining the spring load or tension.

Figure 16:
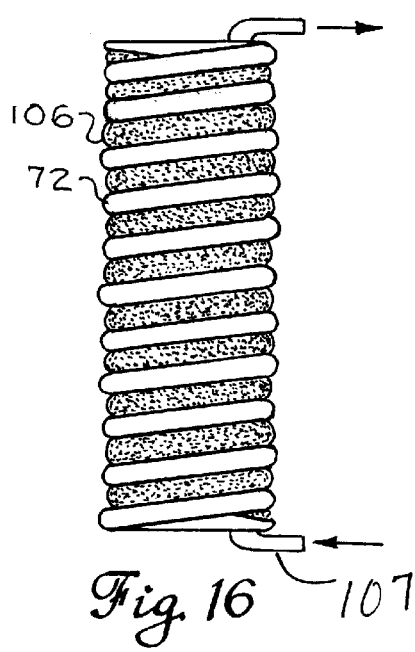
FIG. 16 shows an elevation view of an airbag embodiment of the load compensation adjuster of the present invention.

Referring to FIG. 16, load compensation adjustment is achieved by using an alternative embodiment such as an airbag 106 to replace overload spring 100 inside spring 72. Airbags and their construction and operation are well known to those skilled in the art, and are not therefore described further herein. Airbag 106 can be inflated or deflated for the desired suspension via a port 107, either by the user or pre-inflated at the factory.

Figure 17:
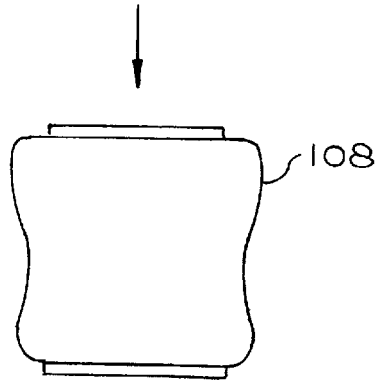
FIG. 17 shows an elevation view of an airbag embodiment of the load compensation adjuster of the present invention.

Referring to FIG. 17, an alternative embodiment for load compensation adjustment includes an airbag 108 which could replace the spring within a spring combination by acting as a variable compression spring. As the air in airbag 108 becomes compressed, the force required to compress it further increases.

Figure 18:
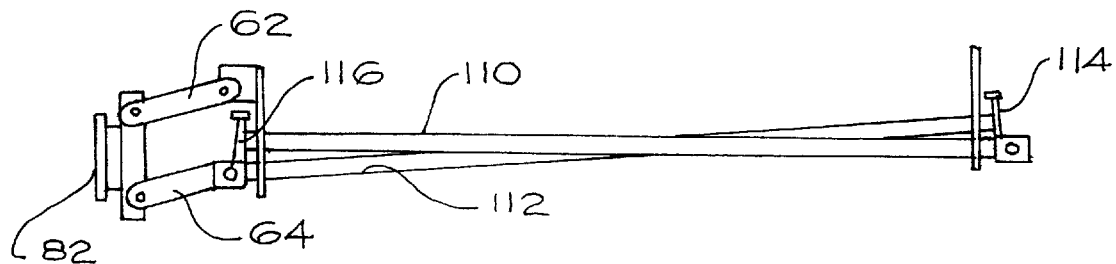
FIG. 18 shows a partial view of a front or rear suspension system according to an embodiment of the present invention.

Referring to FIG. 18, a torsion bar suspension is shown connected to wheel hub 82 at the left rear wheel location for mower 10. A first torsion bar 112 is hooked to lower link 64 at one end, while another end attaches to an adjuster 114, which permits adjustment of the tension of torsion bar 112. In similar fashion, a second torsion bar 110 is hooked to the lower link 64 on the right side of mower 10, with the other end of torsion bar 110 being attached to an adjuster 116 which is connected to lower link 64 on the left side of mower 10. The right side wheel hub and upper and lower links are not shown in FIG. 18. The torsion bars 110, 112 replace the springs 72 to provide the rear wheel suspension. Load compensation is done with adjusters 114, 116. Although the torsion suspension is shown for the rear wheels, it can be used on the front wheels as well. For the front suspension system shown in FIG. 4, front transverse member 54 and springs 50 are replaced by the torsion bars in the manner just described with respect to the rear suspension system.

Figure 19:
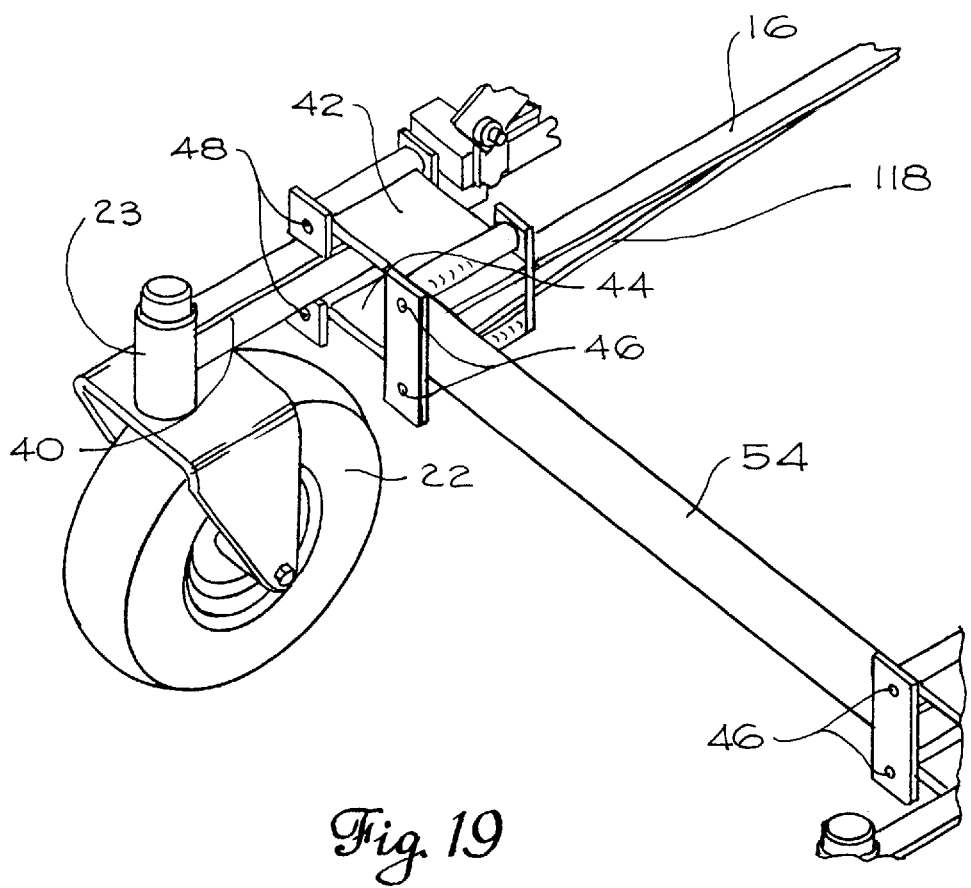
FIG. 19 shows a partial view of a front suspension system according to an embodiment of the present invention.

Referring to FIG. 19, an alternative embodiment of the front suspension system includes a torsion bar 118 attached to lower suspension strut 44 near the lower main frame pivot point 46. Torsion bar 118 is approximately 1.5 to 2.5 feet (45 to 76 cm) long and extends lengthwise to attach to main frame 16. A similar arrangement provides the front suspension for the other front wheel.

Figure 20:
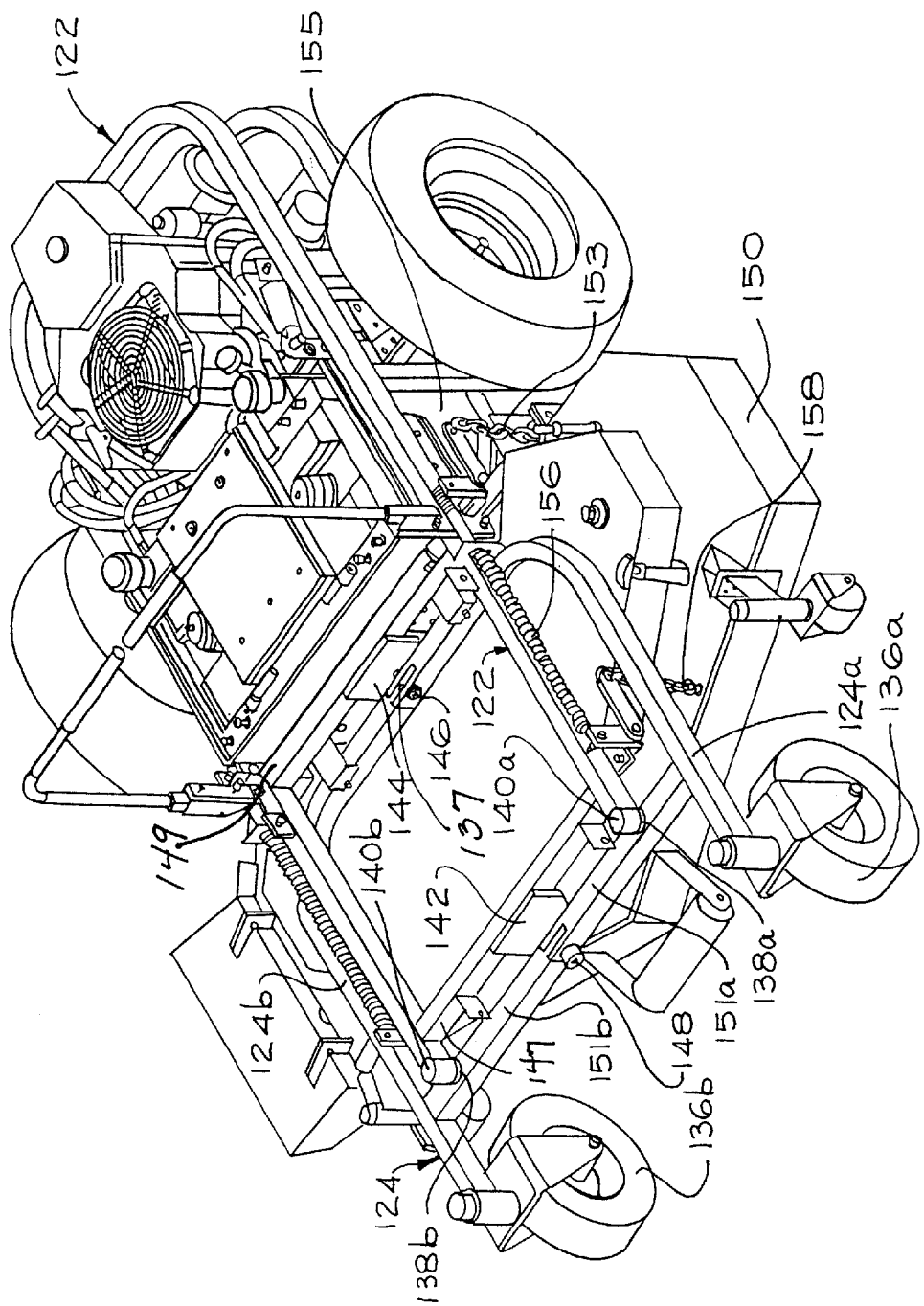
FIG. 20 shows a perspective view of a mower with an embodiment of a front suspension system according to the present invention.

Referring to FIG. 20, in another embodiment, a main frame 122 is connected to a pivoting subframe 124 that incorporates a front suspension system. Pivoting subframe 124 includes a left half subframe 124a which is hingeably connected to a right half subframe 124b. Two hinges, such as a front clevis joint 135 and a rear clevis joint 137, connect left and right half subframes 124a, 124b to each other. A front pivot pin 146 acts as the clevis pin for front clevis joint 135 while a rear pivot pin 148 acts as the clevis pin for rear clevis joint 137. Front pivot pin 146 is connected to a front transverse member 147 of main frame 122 via a front pivot plate 142, while rear pivot pin 148 is connected to a rear transverse member 149 of main frame 122 via a rear pivot plate 144.

A left spring pocket 140a, connected to an extension of main frame 122, houses a left spring 138a that abuts a front transverse portion 151a of left half subframe 124a, while a right spring pocket 140b, connected to an extension of main frame 122, houses a right spring 138b that abuts a front transverse portion 151b of right half subframe 124b. Thus, when a left caster wheel 136a rolls into a dip, left half subframe 124a moves with it, not affecting right half subframe 124b or main frame 122. Similarly, when a right caster wheel 136b rolls into a dip, right half subframe 124b moves with it, not affecting left half subframe 124a or main frame 122. Thus, three of the four mower wheels are on the ground at any given time, resulting in a stable, smooth ride with little or no scalping caused by the cutter deck.

In this embodiment, rear suspension chains 153 for a cutter deck 150 are attached to rear wheel brackets 155 via a cutter deck lift assembly 156, while front suspension chains 158 for cutter deck 150 are attached via cutter deck lift assembly 156 to main frame 122. The weight distribution in a lawn mower of this type is approximately 75% in the rear and 25% in the front. Thus, whereas the rear of the cutter deck is preferably connected to the rear wheel brackets instead of the main frame to avoid scalping during sharp turns or over rough terrain, the front of the cutter deck is preferably connected directly to the main frame in this embodiment.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method of compensating for load change in a lawnmower having independent suspension, the method comprising:

providing a main frame having first and second wheels coupled to the main frame and to respective independent suspensions, each independent suspension having a spring and a load compensation adjuster, the spring having a range of compression between an uncompressed state and fully compressed state;

providing a seat coupled to the main frame;

applying a downward force upon the seat;

moving the seat downward in response to the downward force;

moving the main frame downward with respect to the first wheel independently of movement of the second wheel;

compressing the spring in response to movement of the main frame to a position within the range of compression between the uncompressed state and the fully compressed state;

exerting a first force from the spring to the main frame in response to compressing the spring;

compressing the load compensation adjuster in response to movement of the main frame;

exerting a second force from the load compensation adjuster to the main frame in response to compressing the load compensation adjuster; and limiting compression of the spring to less than full compression by exerting the second force from the load compensation adjuster to the main frame.

2. The method of claim 1, wherein the load compensation adjuster is a coil spring.

3. The method of claim 1, wherein the load compensation adjuster is a shock absorber.

4. The method of claim 1, wherein the load compensation adjuster is an air shock.

5. The method of claim 1, wherein the load compensation adjuster is an airbag.

6. The method of claim 1, wherein compressing the load compensation adjuster includes exerting an increasing reactive force against compression responsive to increasing compression of the spring.

7. The method of claim 1 wherein:
the spring has a range of compression; and
the load compensation adjuster exerts a reactive force to compression of the spring only in a portion of the range of compression of the spring.

8. The method of claim 1, further comprising limiting compression of the spring from a bottomed out condition via the load compensation adjuster.

9. A method of compensating for load change in a lawnmower having independent suspension, the method comprising:
providing a main frame having first and second wheels coupled to the main frame and to respective independent suspensions, each independent suspension having a first spring and a second spring, the first spring having a range of compression between uncompressed and fully compressed;
moving the main frame downward with respect to the first wheel independently of movement of the second wheel;
compressing the first spring to a position within the uncompressed and fully compressed range in response to movement of the main frame;
exerting a first force from the first spring to the main frame in response to compressing the first spring;
compressing the second spring in response to movement of the main frame;
exerting a second force from the second spring to the main frame in response to compressing the second spring; and
preventing the first spring from being fully compressed by the main frame as a result of the second force from the second spring to the main frame.

10. The method of claim 9, wherein the second spring is compressed after partial compression of the first spring.

11. The method of claim 9, wherein the second spring is a shock absorber.

12. The method of claim 9, wherein the second spring is an air shock.

13. The method of claim 9, wherein the second spring is an airbag.

14. The method of claim 9, wherein compressing the second spring includes exerting an increasing reactive force against compression responsive to increasing compression of the first spring.

15. The method of claim 9, further comprising limiting compression of the first spring from a bottomed out condition via the second spring.

16. A method of compensating for load change in a lawnmower having independent suspension, the method comprising:
providing a main frame having first and second wheels coupled to the main frame by respective independent suspensions, each independent suspension having a spring and a load compensation adjuster;
moving the mower across a surface;
moving the first wheel upward and downward relative to the main frame;
moving the second wheel upward and downward relative to the main frame independently of movement of the first wheel;
changing compression of the springs of the independent suspensions in response to movement of the first and second wheels;
compressing the load compensation adjuster of each independent suspension in response to upward movement of the first and second wheels with respect to the main frame; and
generating forces from the load compensation adjusters to prevent the springs from fully compressing and binding upon movement of the first and second wheels.

17. The method of claim 16, wherein the load compensation adjuster is a coil spring.

18. The method of claim 16, wherein the load compensation adjuster is a shock absorber.

19. The method of claim 16, wherein the load compensation adjuster is an air shock.

20. The method of claim 16, wherein the load compensation adjuster is an airbag.

21. The method of claim 16, further comprising exerting an increasing reactive force against compression of the load compensation adjusters responsive to increasing compression of the springs.

22. The method of claim 16, wherein the springs have respective ranges of compression, the method further comprising exerting reactive forces by the load compensation adjusters responsive to compression of the springs only in a portion of the ranges of compression of the springs.

23. The method of claim 16, further comprising preventing the springs from bottoming out.

24. The method of claim 16, further comprising a cutter deck positioned below the main frame, wherein the cutter deck moves independently of the main frame.

25. A method of compensating for load change in a lawnmower having independent suspension, the method comprising:
providing a main frame having first and second wheels coupled to the main frame by respective independent suspensions, each independent suspension having a first spring and a second spring;
moving the mower across a surface;
moving the first wheel upward and downward relative to the main frame;
moving the second wheel upward and downward relative to the main frame independently of movement of the first wheel;
changing compression of the first spring of the first independent suspension in response to movement of the first wheel;
compressing the second spring of the first independent suspension in response to movement of the first wheel in an upward direction with respect to the main frame; and
limiting compression of the first spring with the second spring to less than full compression upon movement of the first and second wheels in order to prevent binding of the first spring.

26. The method of claim 25, wherein the first and second springs are coil springs.

27. The method of claim 25, wherein the second spring is a shock absorber.

28. The method of claim 25, wherein the second spring is an air shock.

29. The method of claim 25, wherein the second spring is an airbag.

30. The method of claim 25, wherein compressing the second spring includes exerting an increasing reactive force against compression responsive to increasing compression of the first spring of the first independent suspension.

31. The method of claim 25, wherein the first spring has a range of compression, the method further comprising exerting a reactive force to compression of the second spring only in a portion of the range of compression of the first spring.

32. The method of claim 25, further comprising exerting a force from the second spring to prevent the first spring from bottoming out.

33. The method of claim 25, further comprising a cutter deck positioned below the main frame, wherein the cutter deck moves independently of the main frame.

34. A method for assembling a mower, the method comprising:

providing a main frame with a cutter deck and at least one rotatable cutter in the cutter deck;

placing two wheels on opposite sides of the main frame;

coupling each wheel to the main frame with a respective independent suspension, each independent suspension having a spring and a load compensation adjuster, wherein each independent suspension and wheel is movable vertically up and down relative to the main frame, respectively against and with force exerted by the spring and by the load compensation adjuster when compressed, independently of movement of the other wheel;

positioning the spring of each independent suspension to bias a respective wheel of the two wheels in a downward direction, the spring having a range of compression between uncompressed and fully compressed states;

positioning the load compensation adjuster of each independent suspension in a location inside a respective spring of the independent suspension, the load compensation adjuster having a range of compression;

preventing full compression of the spring with the load compensation adjuster;

placing two additional wheels on opposite sides of the main frame;

coupling each additional wheel to the main frame; and coupling the cutter deck to the main frame.

35. The method of claim 34, wherein positioning the spring includes pre-compressing the spring.

36. The method of claim 35, wherein pre-compressing the spring includes tightening a threaded fastener passed through the spring.

37. The method of claim 36, wherein attaching the threaded fastner includes threading a nut on the fastner to attain a desired spring pre-compression.

38. The method of claim 34, wherein the load compensation adjuster is a coil spring.

39. The method of claim 34, wherein the load compensation adjuster is a shock absorber.

40. The method of claim 34, wherein the load compensation adjuster is an air shock.

41. The method of claim 40, further comprising changing air pressure in the air shock to change a spring rate of the air shock.

42. The method of claim 34, wherein the load compensation adjuster is an airbag.

43. The method of claim 42, further comprising changing an inflation level of the airbag to change a spring rate of the airbag.

44. The method of claim 34, wherein the load compensation adjuster is positioned to prevent the spring from bottoming out.

45. The method of claim 34, wherein the load compensation adjuster is positioned to exert reactive force to compression only in a portion of the range of compression of the spring.

46. The method of claim 34, wherein the load compensation adjuster is positioned to exert reactive force to compression in the range of compression of the spring.

47. The method of claim 34, wherein coupling each additional wheel to the main frame includes coupling each additional wheel to the main frame by a respective independent suspension.

48. The method of claim 34, wherein the cutter deck is coupled to the main frame by the independent suspensions.

* * * * *